United States Patent [19]

Ziesse

[11] 4,449,174

[45] May 15, 1984

[54] HIGH FREQUENCY DC-TO-DC CONVERTER

[75] Inventor: Norman G. Ziesse, Chester, N.J.

[73] Assignee: Bell Telephone Laboratories, Incorporated, Murray Hill, N.J.

[21] Appl. No.: 445,669

[22] Filed: Nov. 30, 1982

[51] Int. Cl.³ .......................................... H02M 3/335
[52] U.S. Cl. ....................................... 363/21; 363/40; 363/97; 323/222
[58] Field of Search ................... 323/222; 363/15, 16, 363/21, 40, 97, 124

[56] References Cited

U.S. PATENT DOCUMENTS

| | | | |
|---|---|---|---|
| 4,097,773 | 6/1978 | Magnus | 307/296 |
| 4,184,197 | 1/1980 | Cuk et al. | 363/40 X |
| 4,257,087 | 3/1981 | Cuk | 363/40 X |
| 4,276,586 | 6/1981 | Boekhorst | 363/21 |
| 4,318,164 | 3/1982 | Onodera et al. | 363/21 |
| 403,919,656 | 11/1975 | Sokal et al. | 330/51 |

OTHER PUBLICATIONS

"Application of RF Circuit Design Principles to Distributed Power Converters", Ronald J. Gutmann, pp. 156–164, *IEEE Transactions on Industrial Electronics and Control Instrumentation*, vol. 1CE1-27, No. 3, 8/1980.

"200-kHz Power FET Technology in New Modular Power Supplies," Richard Myers & Robert D. Peck, *Hewlett Packard Journal*, Aug. 1981, pp. 3–7.

"High Efficiency Switching Regulator Using Subclass E Switching Mode", Toshihiro Onodera, Yoich Masuda & Akira Nakajima, *Proceedings of the Third International Telecommunications Energy Conference Intelec 81*, May 14–21, 1981, pp. 132–137.

Primary Examiner—William M. Shoop
Attorney, Agent, or Firm—Alfred G. Steinmetz

[57] ABSTRACT

A power conversion circuit is operated at high frequency in the radio frequency spectrum to utilize adjunct reactive impedances of the active semiconductor devices as part of an impedance transformation circuit. Power is transferred through the converter at substantially a single frequency. Energy storage of the adjunct reactances is positively utilized to limit power dissipation within the converter.

26 Claims, 11 Drawing Figures

HIGH FREQUENCY DC-TO-DC CONVERTER

TECHNICAL FIELD

This invention relates to power conversion apparatus and, more particularly, to power converters having an assemblage of discrete electrical components combined with positive utilization of adjunct electrical characteristics of the active and nonlinear devices of the circuit thereby achieving electrical circuit performance properties exceeding the apparent performance range of the individual discrete components, and utilized to facilitate operation in the high radio frequency spectrum (in excess of 5 MHz). It is further concerned with a power supply which offers dimensions in power density or volume, physical aspect ratio, reliability, transient response, and manufacturing cost not normally associated with the conventional art.

BACKGROUND OF THE INVENTION

Present power conversion apparatus normally comprises a plurality of discrete electrical components joined by electrical conductors. These components are normally classified for expository purposes and for design purposes into subcircuits identified as power modulation circuits, filter circuits, rectifier circuits, etc., each of which perform a distinct and separate function important to the overall circuit. The individual sizes of the individual electrical components such as cored magnetic components and electrolytic capacitors, in combination with spacing between components in the interest of good circuit design, result in a power supply whose linear and volumetric dimensions, in many instances, almost equals or sometimes exceeds the circuitry or system being powered. In this age of the printed-circuit-board-mounted modular circuits, the power supply, because of its size, is usually located a considerable distance from the circuit being powered. As a result of this size limitation, the bulk power supply concept is used in which a single power supply supplies power to a great number of circuits whether they are operative or not at any particular moment, rather than having a dedicated power supply for each individual circuit which can be turned off when the circuit is not operative.

If one wishes to dedicate power supplies for a particular circuit and have them located physically close thereto, the size of the power supply must be reduced by a considerable amount from that of the accepted sizes of the power supplies in the current state of the art.

A typical switching-type power conversion circuit operates by storing energy in various ones of its discrete capacitive and inductive components for one cycle length periods of time determined by the switching frequency. An increase in switching frequency reduces the storage time interval and the level of energy stored in storage components in any one particular cycle of operation. It is apparent that this increase in frequency permits both the physical and electrical sizes of magnetic and capacitive storage elements to be reduced for any particular power capacity.

Inasmuch as a significant increase in operating frequency of a converter permits a significant size reduction in the circuit components on the basis of energy storage per unit volume, the fact that the switching frequency of power converters has not increased dramatically is indicative of other constraints on the increase of operating frequencies. For example, the switching speed of bipolar semiconductor switching devices is limited by charge storage thereby limiting the benefits to be achieved from high frequency operation. This may, in part, be overcome by use of an existing power MOSFET switching transistor; however, its switching speed is limited by its device capacitances and the parasitic inductance of its lead wires.

Conventional passive components also present problems at high frequencies. At high frequencies, the parasitic inductance and resistance of a capacitor decrease its efficiency. The interwinding capacitance of inductors and the self-heating of the wire and core of the inductor also limit the switching frequency attainable. Individual circuit components generally include parasitic electrical parameters which become excessive at high frequencies and considerable design effort must be expended to compensate for them. It is likely that an increase in size will be required to minimize losses and that this increase will offset all benefits expected on the basis of energy storage considerations.

The circuit layouts have numerous stray capacitances and inductances which detract from power supply performance at high frequency. Capacitors exhibit parasitic inductance and resistances that lower the performance thereof below acceptable values at high frequencies. Power magnetics have undesirable winding capacity at high frequency, and both inductors and capacitances exhibit undesirable self-resonant characteristics. Because of these complicating factors due to undesirable parasitic effects the actual trade off of frequency to attain size reduction is unlikely to be linear or predictable for any particular conventional topology of power conversion circuits. The final result is that to achieve significant size reduction, the operating frequency must be so high that the problems alluded to hereinabove overwhelm the power supply designer thereby limiting the advent of the very high frequency power conversion circuit.

So despite the theoretical advantages of high frequency operation of power conversion circuits, these circuits have not been developed because of the many component and design problems related to operational difficulties at very high frequencies.

FCC regulations concerning the control of electrical radiation generated place further constraints on the development of high frequency power supplies since the necessary arrangements to shield or eliminate the electromagnetic radiation add to the cost of the circuit and limit its commercial viability.

In order to fully realize the benefits of high frequency power conversion circuits, the specific power conversion circuit must be capable of operating without radiating significant electromagnetic interference and without seriously suffering the deleterious effects of parasitics of the circuit components. It must also be properly sized to permit its location adjacent to the circuits being powered and must further be efficient in operation and economical to manufacture in order to be commercially viable.

SUMMARY OF THE INVENTION

A power conversion circuit, embodying the principles of the invention, is designed to benefit from the advantages of high frequency operation by using the adjunct electrical characteristics of components as positive circuit elements at frequencies in the radio frequency spectrum selected sufficiently high so that these adjunct characteristics are fully and positively utilized. The term adjunct component is used herein to mean electrical components characteristics inherent in a device or component that are often called deleterious parasitic components but which are positively utilized in the illustrative circuit herein embodying the principles of the invention. The particular example herein is embodied in a unique integrated power supply construction permitting low circuit profile, low cost and high reliability. Inductive components of the exemplary power conversion circuit disclosed herein are printed on a dielectric substrate material all of which is included within a conductive enclosure. Input and output filter capacitors in this particular example are each formed by applying a dielectric and a second conforming plate to an outer surface of the conductive enclosure.

The power circuitry includes a field effect semiconductor switching device utilizing the enclosure as a heat sink and driven by sinusoidal type waveforms with low harmonic content and electrically coupled to operate into a tuned impedance matching circuit coupled, in turn, to a tuned rectification circuit. Energy is transferred through the active devices and the impedance matching network at substantially a single frequency with minimal harmonics from a DC input to a DC output and with a minimum time interval of energy storage in the inductive and capacitive elements of the circuits.

The adjunct capacitances of the switching devices are positively used to prevent power dissipation within the switch portion of the device. The use of these adjunct characteristics of the individual components further limits the need for discrete components thereby permitting multifunctioning of individual components and the embodiment of the power conversion circuit in an integrated type form, thereby permitting economical manufacture and a high power density resulting in a circuit size that permits it to be mounted on a single circuit board with the circuit to be powered thereby.

While specific physical example of a circuit is shown below, the principles of the invention illustrated therein may be embodied in many other physical constructions having similar energy storage and transmission characteristics.

BRIEF DESCRIPTION OF THE DRAWING

The principles of the invention may be readily understood by reference to the following specification and the drawing in which.

DETAILED DESCRIPTION

Figure 1:
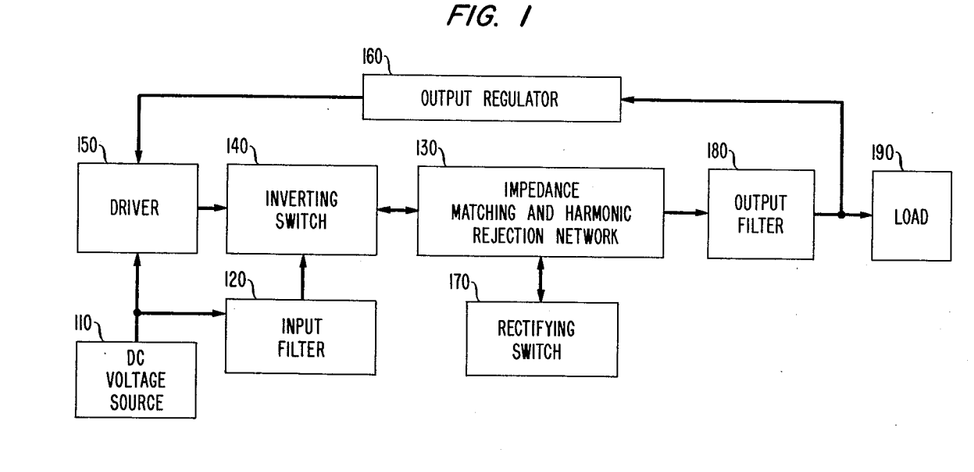
FIG. 1 is a block schematic of a power converter circuit using a semiconductor power inverting switch operating in a tuned circuit mode.

A resonant DC-to-DC power conversion circuit embodying the principles of the invention and operative for converting DC voltage from one level to another level is shown in block schematic in FIG. 1. In the power conversion process, DC voltage is converted to an AC voltage signal having substantially a single frequency with harmonics attenuated. The power circuit then rectifies that AC voltage signal to some DC level at the circuit output. As shown in FIG. 1, a DC source of voltage 110 is coupled to an input filter 120 which functions to isolate signal noise and signal harmonics from the DC voltage source 110. The DC voltage source 110 is coupled through the input filter 120 to a voltage driven nonlinear power inverting switch device 140 such as a field effect transistor (MOSFET) which, in turn, is coupled to the impedance matching network 130. The power inverting switch 140 is periodically driven into alternate conductive and nonconductive states by a sinusoidal drive signal supplied by a driver circuit 150. Driver circuit 150 is powered by the DC voltage source 110 and is responsive to feedback signals supplied by the output regulator circuit 160.

The impedance matching network 130 comprises reactive components and operates in combination with the rectifying switch 170, output filter 180 and a load circuit 190 to present a conrolled impedance to the output of the power inverting switch 140. This controlled impedance operates in cooperation with the adjunct electrical characteristics of switch 140 at the selected operating frequency and passes energy to the load at substantially the fundamental switching frequency. The impedance matching network 130, rectifier network 170 and the filter network 180 including the load 190 is designed as one common tuned load network including all adjunct reactive characteristics of the active and passive components to be tuned at the power converter operating frequency, so that signal reflections are substantially eliminated and energy is transmitted through the circuit only at substantially the tuned frequency rather than transmitting energy over a wide frequency spectrum of fundamental and harmonic signals. This significantly limits power dissipation and permits the realization of a high efficiency of the power train at a high fundamental frequency.

Figure 2:
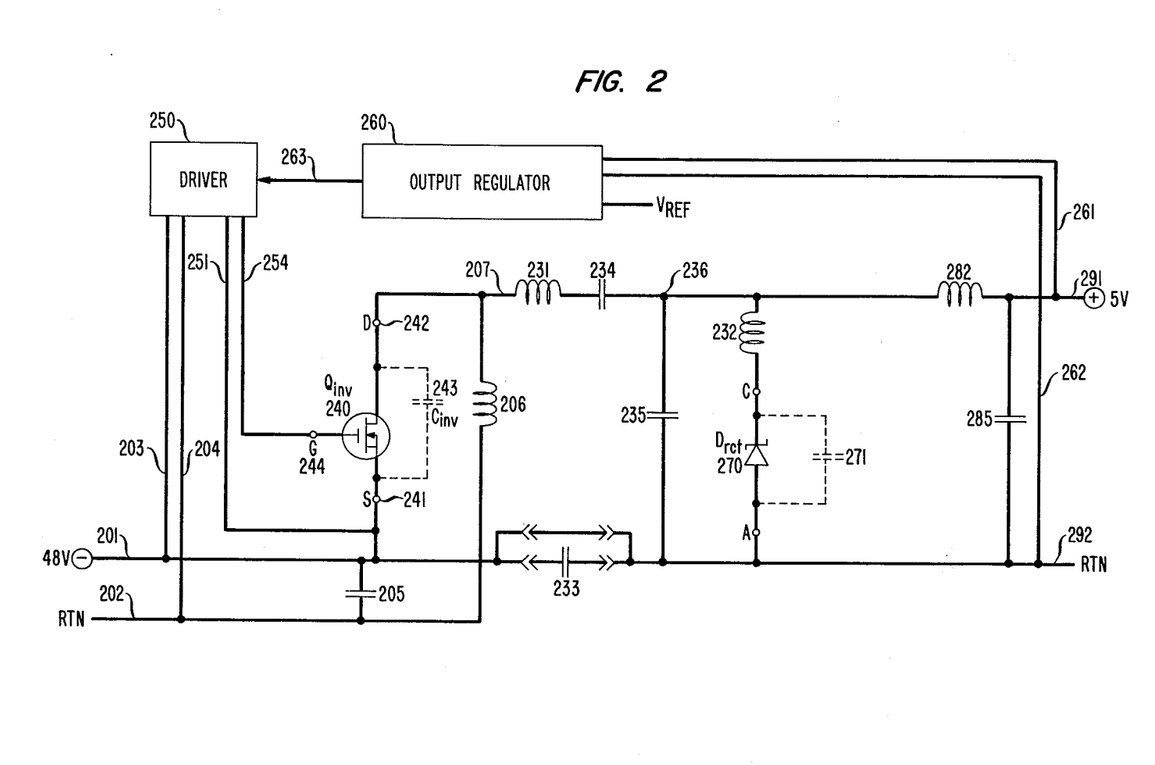
FIG. 2 is a circuit schematic of a power converter positively utilizing adjunct electrical characteristics of the circuit components and operating in a tuned circuit mode.

An electrical schematic representation of the power train portion of a power conversion circuit embodying the principles of the invention is disclosed in FIG. 2. This circuit includes a MOSFET semiconductor power inverting or power modulating switch 240 and a Schottky semiconductor rectifying switch 270 in the power train portion of the circuitry. The passive components of this circuitry are realized through the use of selected lumped components acting in circuit with adjunct internal semiconductor device capacitances.

A DC voltage input is coupled to the input terminals 201 and 202 which, in turn, couples the DC voltage via leads 203 and 204 to power an inverting switch driver circuit 250 supplying sinusoidal drive signals for the power inverting switch 240. The DC voltage on leads 201 and 202 is coupled via an input filter comprising filter capacitor 205, and input filter inductor 206 to the main conduction path of the power inverting switch 240. The inductance value of input filter inductor 206 may be selected to contribute to the impedance matching properties of the impedance matching network joining the power inverting switch 240 to the rectifying switch 270, although generally this inductor would be chosen to have a high reactance at the switching frequency of the inverting switch 240 and not contribute to the impedance matching properties. The combination of filter inductor 206 and filter capacitor 205 is selected to have a high attenuation at the switching frequency and its harmonics, thereby minimizing the radio frequency current flowing back into the DC input voltage source. Additional stages of low pass filtering may be employed to render this current arbitrarily small. One input terminal 201 is directly coupled to the source terminal 241 of the power inverter switch 240. The second input terminal 202 is coupled via filter inductor 206 to the drain terminal 242 of the power inverting switch 240.

A second inductor 231, an inverter capacitor 234 and a third inductor 232 which form a part of the impedance matching network and harmonic rejection filter are coupled to a Schottky rectifying diode 270 which, in turn, is coupled to a zero frequency isolating return capacitor 233 used only if DC isolation is desired. If this capacitor 233 is used, additional common-mode filtering may be required on the input. A filter network comprising a capacitor 285 and inductor 282 couples the impedance matching network to the output terminals 291 and 292.

The capacitor 285 and inductor 282 are selected to offer a high attenuation at the fundamental operating frequency and at the harmonics of this operating frequency. As with the input filter, additional stages of low-pass filtering may be employed to render the output ripple voltage arbitrarily low. Inductor 282 may further be selected to contribute to the impedance matching function of the impedance matching network between the inverting switch 240 and the load connected to terminals 291 and 292.

The inverting switch 240 is shown in FIG. 2 with its drain to source capacitance shown as capacitor 243 schematically designated in dotted form. This capacitance is an integral part of switch 240 and is not separable therefrom. It represents the sum total of adjunct internal capacitances which appear between drain and source terminals of the switch and is represented in the schematic by its equivalent linear capacitance although in reality, it is a substantially nonlinear capacitance which varies with the drain-to-source voltage on the FET.

The rectifier switch 270, shown as a Schottky diode, is shown including its adjunct internal shunt capacitance 271 in dotted form. This capacitance is the linear equivalent of all the adjunct capacitances of the rectifying switch, the predominant one of which is nonlinear.

The impedance matching network, which also acts to block transmission of harmonics of the fundamental operating frequency, comprises the inductors 231 and 232 and the capacitors 234 and 235. As stated, inductors 206 and 282 may become part of this network unless they are made sufficiently large so as to be negligible. This network is tuned to transfer substantially all of the energy at the fundamental of the operating frequency of the power converter and to eliminate power dissipation losses in the inverting switch 240 and rectifying switch 270 by substantially eliminating overlapping voltage-current intervals therein. It is noted that the passive power train circuitry as a whole including a load network operates in near resonance with the power inverting switch 240, which fact will be apparent in the below description of the operation of the circuit.

The output voltage is sensed by sensing leads 261 and 262 coupled to an output regulation circuit 260 which, in turn, controls a driver circuit 250 supplying sinusoidal signals driving the power inverting switch in order to maintain the output voltage at some regulated value. While several regulation methods may be used, the particular method used herein uses an error signal of the output regulation circuit 260 to control the signal frequency output of the driver circuit 250. The output regulator 260 generates the error signal by comparing the output voltage sensed at leads 261 and 262 to a reference voltage. The error voltage is applied to a voltge controlled oscillator also situated within output regulator 260. The oscillator output is coupled via a buffer stage and lead 263 to the input of the driver. The sinusoidal output of the driver circuit 250 is applied via leads 251 and 254 to the source terminal 241 and gate terminal 244 of the inverting switch 240, respectively.

The principles of the invention may be illuminated by discussing the operating principles of the circuit embodiment shown in schematic form in FIG. 2. Energy is derived from a DC voltage source coupled to the input terminals 201 and 202 and through the chopping action of inverting switch 240, impedance transformation of the impedance matching network and rectifying action of rectifying switch 271, it reappears as a DC voltage at some preselected level at the output terminals 291 and 292 which are coupled to a load.

This power conversion circuit is specifically designed as a narrow band circuit in which energy transfer from the inverting switch 240 to the rectifying switch 270 occurs substantially at one fundamental frequency. Sinusoidal-type waveforms predominate as contrasted to pulse waveforms of conventional power converters. These sinusoidal or soft waveforms permit energy transfer through the impedance matching network within a narrow band and with little spurious ringing. The switching and rectification of the power signal is resonant. Resonant, as used herein, means that the periodic soft waveforms which substantially reduce simultaneous voltage across and current through switching device 240 and rectification device 270 are created by the natural resonant frequency of the passive device network and the adjunct capacitances of the active devices.

The DC voltage coupled to input terminals 201 and 202 is connected directly to the souce terminal 241 and via inductor 206 to a terminal 207 of inductor 231. Capacitor 205 and inductor 206 comprise a low-pass filter to isolate the DC input voltage from the high fundamental frequency and harmonics generated by the inverting switch. The inductor 206 is sufficient in inductance to constrain the incoming energy to the inverting switch 240 to approximate a constant current source.

Figure 3:
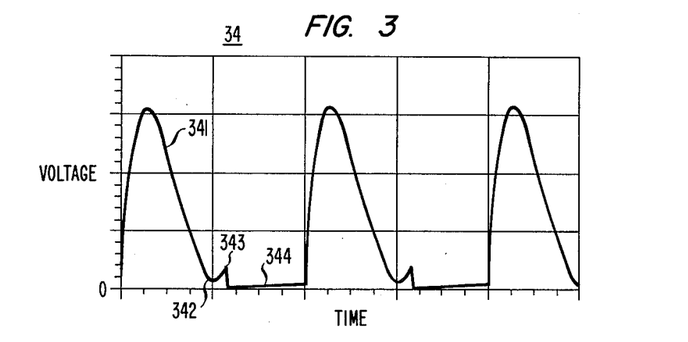
FIGS. 3, 4, 5, 6, 7 and 8 illustrate current and voltage waveforms of the circuit shown in FIG. 2.
Figure 6:
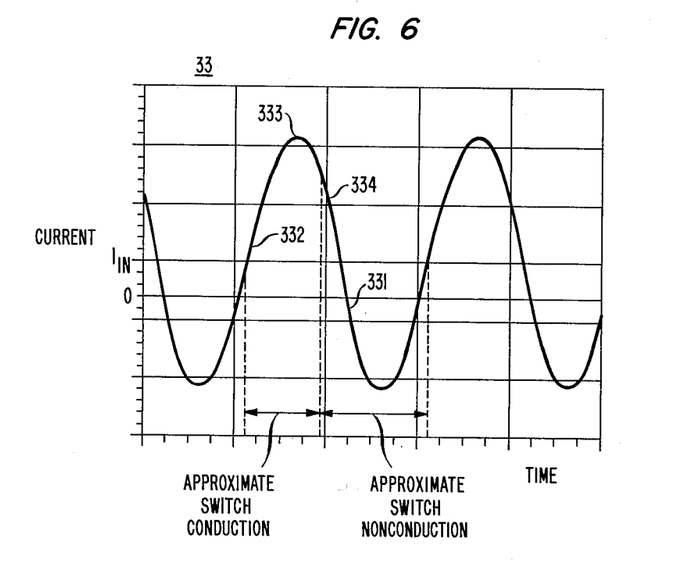

The inverting switch 240 is driven by a sinusoidal drive signal generated by the driver circuit 250 and in response thereto it alternately switches from a nonconducting state into a conducting state and vice versa. Hence the switching of the inverting switch 240 generates a pulsating voltage waveform at its drain terminal 242. Since the input filter presents a high impedance to these high frequency alternation signals, the shape of the signals is determined primarily by the resonant nature of the impedance matching network and adjunct capacitance 243. The actual voltage waveform occurring at the drain terminal 242 in the illustrative embodiment resembles a portion of a sine waveform. The inverting switch 240 may be considered to comprise two parallel paths internally; one path is a pure switching path and in parallel with it is a path representing its internal adjunct capacitance. A typical voltage waveform across the device is shown by voltage waveform 34 shown in FIG. 3, respectively. As shown in FIG. 3, the voltage waveform 34 during most of the nonconducting interval resembles a portion of a damped sine wave. Prior to termination of the conductive state of inverting switch 240, the voltage drops to nearly a zero value at point 342 under certain conditions of load, input voltage and drive frequency, and it rises to a small peak 343 or in some conditions, no peak 343 may exist. In both cases, the waveform returns to a small DC level 344, at which interval, the inverting switch is now conducting current which passes through the main conduction path. The current flow in the inverting switch considered in totality is the current flow in the switch portion plus the current flow in the parallel adjunct capacitance path, and its total value approximates a sine waveform superimposed on a DC level, which is the input current $I_{in}$, as shown by waveform 33 in FIG. 6. During the nonconductive phase of the switch portion, current in the parasitic or adjunct capacitance paths approximates a declining and then a rising sinusoidal waveform 331. During switch conduction, the current waveform is a rising sinsusoid peaking at 333 and declining at 334 as the switch again becomes nonconductive.

Figure 5:
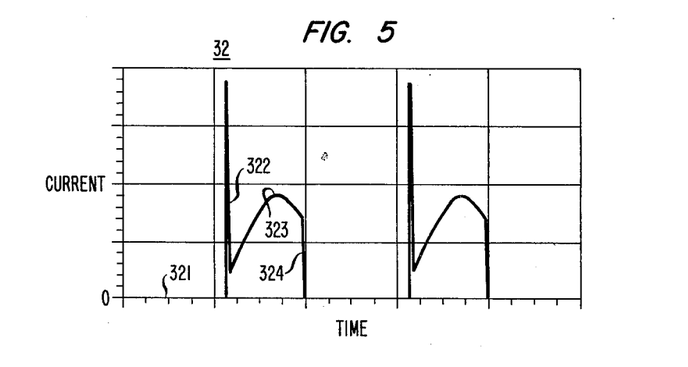

The current flow through the conducting portion of switch 240 alone is shown by waveform 32 in FIG. 5. The current is essentially at zero level 321 during the nonconducting phase and when the switch is initially biased conducting, a sharp current spike 322 occurs due to the small voltage residing on adjunct capacitor 243 followed by a quasi-sinusoidal current waveform 323 which continues until it is relatively quickly terminated when the inverting switch is biased nonconducting at 324. It should be noted that the current and voltage waveforms cooperate so as to produce low power dissipation in the inverting switch. That is, one waveform current or voltage decreases to substantially zero before the other waveform voltage or current attains any substantial magnitude. The current and voltage waveforms 32 and 34 do not overlap appreciably and yet the total current waveform 33 within the inverting switch 240 including the parasitic or adjunct path is essentially continuous. Current flow therein includes harmonics most of which do not go outside the inverting switch 240.

As noted hereinabove, the inverting switch 240 is embodied as a MOSFET transistor whose equivalent circuit includes a large parasitic or internal adjunct capacitance shunting the main conducting path and a small parasitic or in this case, positively utilized adjunct inductance in series with the drain source path. The adjunct capacitance at the operational frequency of the power converter is sufficient in value to absorb the harmonic components generated by the switching or modulating action of the inverter switch and as a result, the currents external to the inverting switch are either direct current or substantially sinusoidal alternating current at the fundamental frequency of operation.

It is important to note that in prior art circuits, considerable power dissipation occurred in the inverting switch at high frequencies because the parasitic inductance and capacitance caused dissipative current flow during the interval that the inverting switch was biased nonconducting. In the power converter herein, the adjunct inductance is merged with the inductance of the impedance matching network inductance to cooperate with the internal adjunct capacitance to eliminate the dissipative discharge. This resonant circuit combination is finally tuned so that the voltage across the adjunct capacitance is low or near zero when the inverting switch is biased conducting thereby eliminating dissipative ringing.

The impedance matching network, as indicated, operates in conjunction with the adjunct capacitance and inductance of the inverting switch 240 to exchange energy among the reactances and assure that energy stored in the shunt adjunct capacitance is essentially zero at the time the inverting switch is biased conducting.

Figure 4:
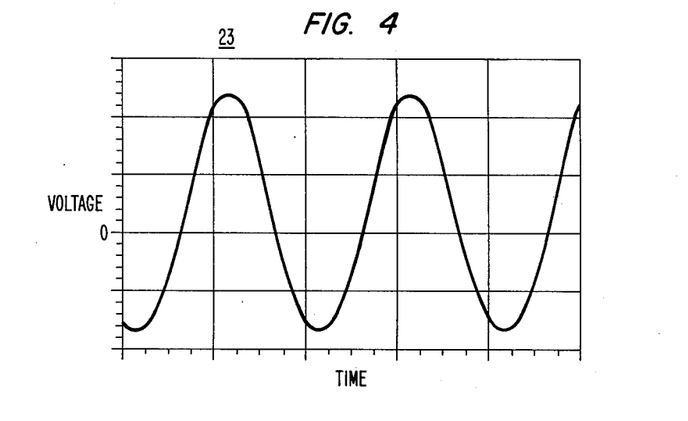

Due to the tuning of the impedance matching network, energy is transferred therethrough at a fundamental frequency to the rectifier at the fundamental frequency as shown by voltage waveform 23 in FIG. 4 representing the voltage at node 236 of the impedance matching network. As is apparent from the voltage waveform, the network is tuned to block transfer of energy at DC or at any harmonics of the fundamental frequency. Hence the energy that flows from the inverting switch to the rectifying switch is approximately a single frequency signal having no DC and with a low level of harmonic components.

The rectifier circuit and output filter circuit reconvert this AC signal to a suitable DC signal at output terminals 291 and 292. The rectifying diode 270 is a Schottky diode and includes a large shunt adjunct capacitance 271 at the power converter's fundamental operating frequency. This adjunct capacitor 271, shown in dotted form in FIG. 2, is used as a path for harmonic signal frequencies generated by the action of the rectifying switch. Since this adjunct capacitance is completely internal to the rectifying device, these harmonic currents are largely confined within the diode and hence cause little power dissipation outside the rectifying device.

An equivalent circuit of the overall rectifying switch device at the power converter's operating frequency and with a resistive load may be characterized as including a series-connected capacitor and resistor. This circuit characteristic is induced by a resistive DC load connected between terminals 291 and 292 and the adjunct shunt capacitance of diode 271 which is tuned in combination with inductor 232 and capacitor 235 to be impedance matched to the inverter portion of the circuit including inductor 231 and capacitor 234.

Figure 8:
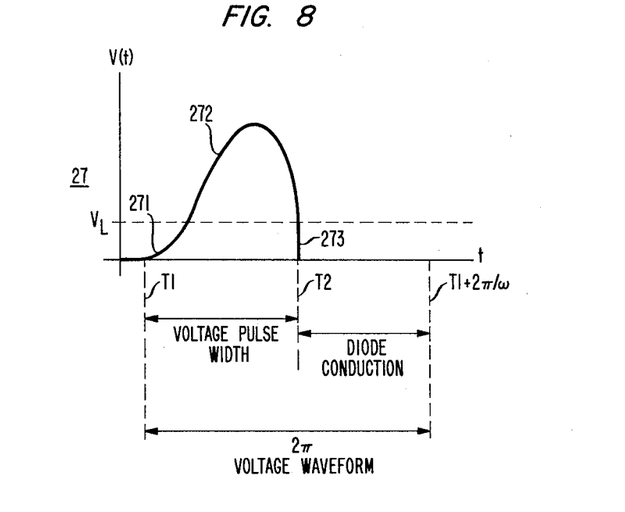

As shown by voltage waveform 27 in FIG. 8 representing the voltage across rectifying diode 270, the voltage appearing thereacross begins with a low slope 271 and rises sharply resembling a sinusoid at 272 and terminates abruptly at 273 just before current conducts in the diode. The rectifying switch conducts in one direction with a low DC voltage drop across it and blocks in the reverse direction with a sinusoid-like waveform drop across it at the same frequency as the voltage drop waveform across the inverting switch 240. The voltage waveform across the rectifying switch 270 roughly resembles the time reversed waveform of the voltage drop across the inverting switch 240.

Figure 7:
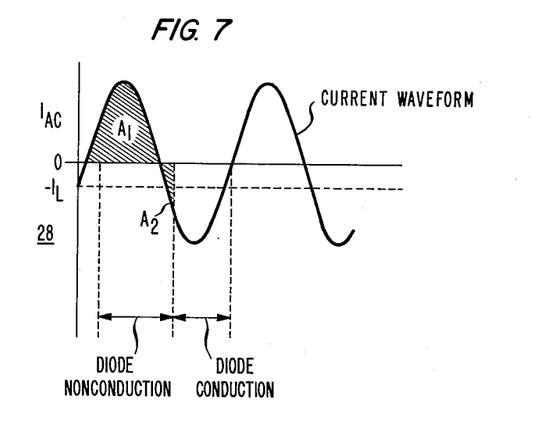

The current waveform 28 in FIG. 7 represents the current through the diode portion of the rectifying switch (diode conduction) and the current through the (diode nonconduction) adjunct capacitance combined. During nonconduction of the diode, current flows (see areas A1, A2) through the adjunct capacitance is as shown and the positive A1 and negative A2 portions have equal areas and cancel each other so that the average terminal current of the whole rectifying switch at its output terminals during this time interval is zero. The average terminal current during an entire period is designated in FIG. 7 as $-I_L$, which is the DC output current.

The rectified voltage signal is coupled to the output terminals 291 and 292 via an output filter comprising capacitor 285 and inductor 282. This filter is designed to suppress alternating currents and voltages at the fundamental operating frequency and harmonics thereof. Hence the voltage appearing across the rectifier appears at the output terminals 291 and 292 is primarily DC voltage. Additional stages of low pass filtering may be added to render any remaining AC voltage, or ripple, arbitrarily small.

The output regulator 260, shown in FIG. 2, contains an output signal monitor that generates an error signal responsive to deviations of the output voltage at terminals 291 and 292 from some predetermined desired DC voltage value. The error signal is utilized to control a voltage controlled oscillator whose frequency varies over a narrow range in response to the error signals. The output of the voltage controlled oscillator is coupled via lead 263 to drive the driver circuit 250.

Regulation in this circuit, in which power is transmitted at a single fundamental frequency, can be obtained by varying the modulation frequency of the power modulation switch 240 as driven by the driver circuit 250. Slight changes in frequency have the effect of retuning the impedance matching network, and primarily inductor 231 and capacitor 234, due to the different responses of the inductive and capacitive elements.

The reactance change in the capacitor 234 differs from the change in reactance of the inductor 231, such that in combination, a small frequency change causes an effective retuning of the entire network which can counteract a change in the output voltage. Exact component values to achieve this will be apparent to those skilled in the art and will vary with different output voltage levels.

Figure 10:
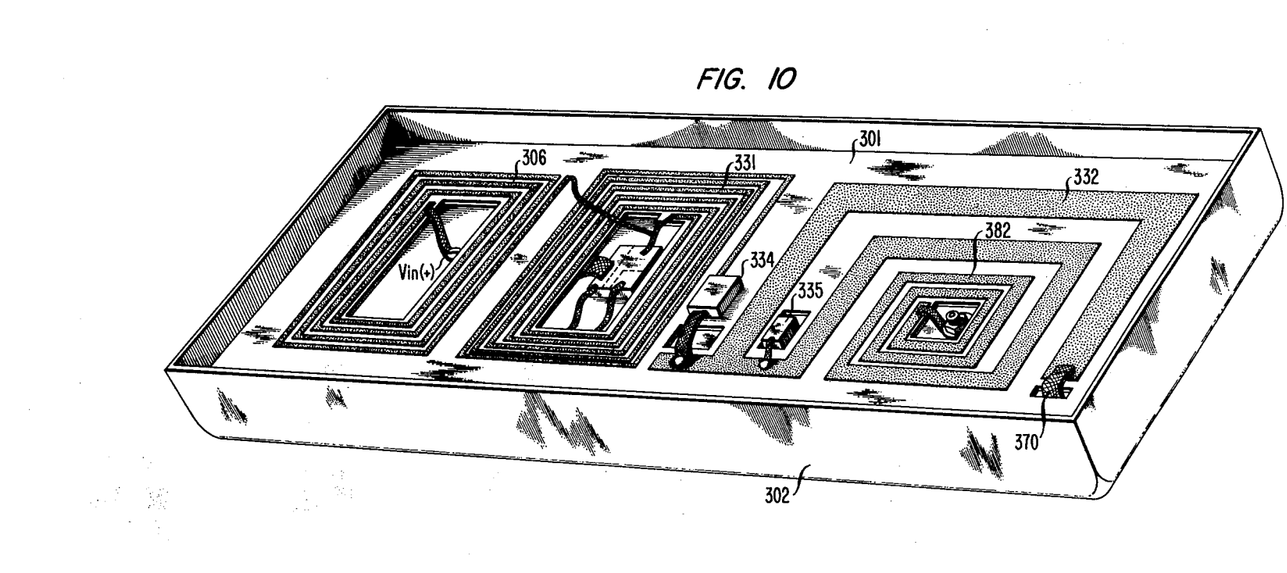
FIG. 10 is a pseudopictorial representation of one particular physical embodiment of a power conversion circuit power train embodying the principles of the invention.
Figure 11:
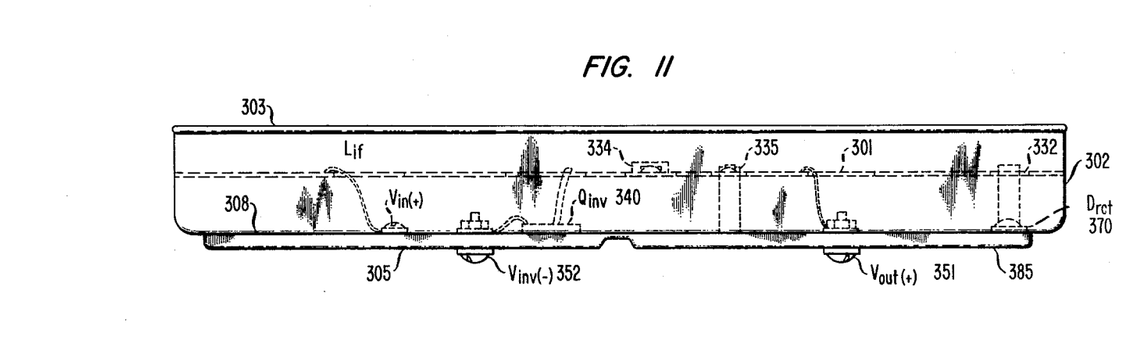
FIG. 11 is a cross-sectional view of the physical embodiment of the power conversion power train shown in FIG. 10.

The physical structure of one illustrative embodiment of the power converter's power train portion is shown in pseudopictorial form in FIG. 10 and a cross section thereof is shown in FIG. 11. The basic components of this structure include a nonconducting substrate 301 which contains the printed inductive components of the circuit; various switching and capacitive discrete electrical components and a highly conductive enclosure 302 surrounding the substrate and the other electrical components. The enclosure is completed with a highly conductive lid 303 which fits on top of the enclosure box 302. This particular physical model shown does not include the DC isolation capacitor 233 shown in FIG. 2.

The physical embodiment of the power train portion of the power conversion circuit, as shown in FIGS. 10 and 11, comprises the central planar substrate structure 301 constructed of a dielectric material. Four inductive elements 306, 331, 332 and 382 are printed on this substrate structure and two capacitive devices 334 and 335 are also attached thereto. The input and output filter capacitors 305 and 385, respectively, are shown laminated to the outside of the enclosure in FIG. 11. The printed inductive elements 306, 331, 332 and 382 are generated by lithographic techniques and are designed to maximize their Q values. The substrate structure is located midway between two conductive ground plane sides 303 and 308 of the enclosure which are constructed of a copper conductive material. These two ground plane structures 303 and 308 are joined by four sidewalls to form a sealed enclosure of conducting material. This enclosure, in its totality, functions as combination ground plane, electromagnetic radiation shield, supporting chassis structure and heat sink arrangement. Since the inductive elements are midway between the two ground planes the electromagnetic field generated is symmetrically distributed around the substrate.

The planar spiral inductors 306, 331, 332 and 382 correspond to the inductors 206, 231, 232 and 282 shown on the schematic of FIG. 2. Because of its low inductance, inductor 232 is not a spiral construction but merely a curved length of conductor.

The design and layout of the spiral inductors is critical due to the effect of skin effect and proximity losses at the high frequency of operation. Factors of importance include the conductor line depth, width and spacing distance between the conductor and the symmetrical ground planes. Conductor depth must take into account skin effect at high frequencies and conductor width and spacing must be considered as to how it relates to proximity losses. Attention must also be given to surface finish of the conductor elements in order to minimize losses.

The input and output power terminals 351 and 353 are connected through the two filter capacitors 305 and 385. The filter capacitors are formed by coating the bottom plate of the conductive enclosure with a dielectric and attaching two conductive plates thereto, thereby creating two flat plat capacitors. Input voltage is applied to screw terminal 352 connected to capacitor 305 and output voltage is obtained from screw terminal 351 attached to capacitor 385.

Figure 9:
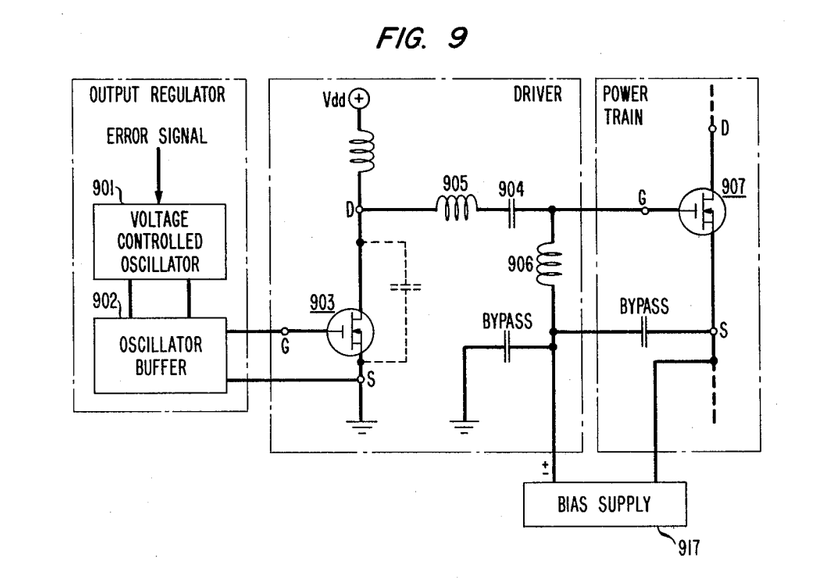
FIG. 9 is a circuit schematic of a driver circuit for controlling a power modulating switch of the power converter shown in FIG. 2.

A driver circuit suitable for use in supplying driving signals for the inverting switch is shown in FIG. 9. It is to be understood that other driver circuits having similar porperties may be used. The driver circuit shown in FIG. 9 comprises a high frequency class C amplifier driven by the voltage controlled oscillator 901 of the regulation circuit through an oscillator buffer circuit 902 and whose frequency is responsive to a feedback error voltage. The amplifier comprises a FET transistor 903, shown in FIG. 9 with its adjunct drain to source capacitance, a capacitor 904 and two inductors 905 and 906. The signal applied to the gate terminal of transistor 903 is a quasi-square wave, although a sine wave drive could also be employed. The driver circuit, in turn, provides a quasi-sine wave signal across the gate to source terminals of the power inverting switch or transistor 907. Inductor 906 is tuned with the gate-to-source capacitance of the power inverting switch to resonate in the vicinity of the operating frequency band. Inductor 905 is large enough to block harmonics of the fundamental frequency and the capacitor 904 is sized so that the series combination of inductor 905 and capacitor 904 also resonate in the vicinity of the operating frequency band. Proper stagger tuning of the two resonant circuits together with adjustment of DC supply voltage VDD yields both the required output voltage level and bandwidth. This driver circuit may be printed on a dielectric substrate and enclosed within a conductive enclosure in the same manner as in the above-described power train circuit. Selection of specific component values is readily apparent to those skilled in the art.

DC bias supply 917 has been shown in FIG. 9 as a technique for changing the conduction duty ratio of the power inverting switch by superimposing the sinusoidal amplifier output on a DC voltage. This has been found useful for minimizing losses in the inverting switch.

While a particular embodiment using air core inductors has been disclosed herein, it is to be understood that the principles of the invention are not limited to the physical embodiment disclosed. For example, versions of the invention can be derived using low loss ferrite core inductors in place of the air core inductors. Many other variations in the circuit that do not depart from the spirit and scope of the invention will be apparent to those skilled in the art.

What is claimed is:

1. A DC-to-DC converter comprising
    a power signal modulating device including adjunct circuit capacitance, a main power signal conduction path and a control terminal for accepting signals to control the main conduction path conductivity,
    input means for coupling a source of power to the main power signal conduction path of the power signal modulating device,
    output means for accepting a load to be energized and including a rectifying device including a main power signal conduction path and adjunct circuit capacitance,
    an impedance matching and harmonic rejection network interconnecting the power signal modulating device and the rectifying device and operative to transfer energy therebetween at a substantially single frequency, and
    driving signal input means for accepting a substantially continuous periodic drive signal and coupled to the control terminal of the power signal modulating device, the periodic drive signal being operative to alternately bias the main power signal conduction path into conducting and nonconducting modes of operation, the periodic drive signal having a frequency identical to the single frequency and the single frequency being selected sufficiently high so that the adjunct circuit capacitance of the power signal modulating device and the rectifying device are fully and positively utilized as integral components of the impedance matching and filtering network.

2. A DC-to-DC converter as defined in claim 1 wherein said impedance matching network includes at least first and second inductors and said converter further including an enclosure of highly conductive material fully enclosing the power signal modulating device, rectifying switch and impedance matching network.

3. A DC-to-DC converter as defined in claim 2 wherein said input means includes a filter capacitor comprising
    a first portion of an outer surface of the enclosure, being coated with a dielectric substance with a conductive plate attached thereover, and
    said output means includes a second filter capacitor comprising
    a second portion of an outer surface of the enclosure, being coated with a dielectric substance and a second conductive plate attached thereover.

4. A DC-to-DC converter as defined in claim 3 and further including a planar substrate of dielectric material located midway within the enclosure and the first, second and third inductors each comprising spiral air core inductors of conductive material printed on the substrate.

5. A DC-to-DC converter as defined in claim 1 wherein the power signal modulating device is coupled to the enclosure by a thermally conductive mounting permitting the enclosure to act as a heat sink.

6. A DC-to-DC converter as defined in claim 1 wherein the first and second inductors in cooperation with the adjunct capacitances of the power signal modulating device and the rectifying device are tuned so that substantially all energy is transmitted therethrough at a fundamental frequency equal to a power modulating frequency of the power signal modulating device, and harmonics thereof are substantially prevented from coupling energy between the power signal modulating device and the rectifying device.

7. A DC-to-DC converter as defined in claim 2 wherein said first, second and third inductors are located in a common plane by supporting means and conductively isolated from the enclosure.

8. A DC-to-DC converter as defined in claim 1 further including regulation control for regulating a voltage at the output means and including an error voltage generator for generating an error voltage responsive to a deviation of a voltage at the output means from a regulated level, and means for varying a frequency of the periodic drive signal away from the single frequency in response to the error voltage whereby the impedance matching and harmonic rejection network is returned by a change in operating frequency to counteract a drift away from a regulation level of voltage at the output means.

9. A DC-to-DC converter comprising
    a power switch having a main conductive path joining first and second terminals and a drive terminal for accepting drive signals and including substantial adjunct capacitance,
    a rectifying switch including substantial adjunct capacitance,
    an impedance matching network coupling the power switch to the rectifying switch including inductive means coupled to and cooperating with the adjunct capacitances of the power switch and rectifying switch at a single frequency so that signal harmonics of the single frequency are substantially prevented from coupling energy between the power switch and rectifying switch, being largely shunted through the adjunct capacitances, and substantially all energy is transmitted through the impedance matching network at the single frequency,
    driving signal input means coupled to the drive terminal of the power switch for accepting continuous periodic drive signals at the single frequency,
    input means for coupling DC voltage to the main conductive path of the power switch, and
    output means for coupling the rectifying device to an output terminal.

10. A DC-to-DC converter as defined in claim 9 wherein an adjunct inductance in series with the main conductive power path of the power switch is merged with a series connected inductance of the impedance matching network to operate cooperatively with the adjunct capacitance of the power switch and minimize dissipative discharge so that high frequency operation at reasonable efficiency is made possible.

11. A DC-to-DC converter as defined in claim 9 wherein said driving means comprises a source of sinusoidal drive signals coupled to the drive terminal of the power switch.

12. A DC-to-DC converter as defined in claim 11 further including an enclosure of highly conductive material fully enclosing the power switch, rectifying switch and the impedance matching network.

13. A DC-to-DC converter as defined in claim 12 wherein said impedance matching network includes at least first, second and third inductors located in a planar substrate within the enclosure.

14. A DC-to-DC converter as defined claim 13 wherein said power switch is mounted on a heat sink element directly coupled to the enclosure.

15. A DC-to-DC converter as defined in claim 14 wherein the planar substrate is positioned within the enclosure midway between opposite walls of the enclosure.

16. A DC-to-DC converter as defined in claim 9 further including
a driving signal source coupled to the driving signal input means and providing a periodic drive signal,
voltage regulation control circuit coupled to monitor a voltage at the output means and operative to alter a frequency of operation of the driving signal source whereby a returning of the impedance matching network is operative to counteract changes in voltage at the output means from a regulated voltage level.

17. A high frequency DC-to-DC converter comprising:
a common mounting substrate of dielectric material,
a power switch having substantial internal adjunct capacitance in parallel with the main conduction path of the switch at an intended operating frequency,
the power switch main conduction path coupled to a matching network transformer including a first and second inductor being embodied as spiral air core inductors printed on the substrate,
the first inductor further coupled to a first terminal of a first capacitor and a first terminal of a second capacitor connected to a second terminal of the first capacitor and a second terminal of the second capacitor connected to ground, the first and second capacitors forming with the first and second inductors a voltage transforming network and being mounted on the substrate,
a rectifying network including a third air core spiral inductor printed on the substrate and a Schottky diode including adjunct capacitance and connected in series with the first and second capacitor and coupled to ground,
the voltage transforming network acting in conjunction with the adjunct capacitances at a single high frequency so that energy flows through the voltage transforming network at substantially a fundamental of the single high frequency and harmonic signals of the single high frequency are absorbed by the adjunct capacitances,
a filter network comprising at least a fourth air core spiral inductor and a third capacitor coupling the fourth inductor to an output terminal, and
the substrate being surrounded by a conducting enclosure operative to block radiation energy.

18. A high frequency DC-to-DC converter as defined in claim 17 further including a driver circuit for generating a periodic drive signal at the single high frequency and coupled to drive the power switch, and means for regulating an output voltage at the output terminal including means for changing a frequency of the periodic drive signal generated by the driver circuit.

19. A DC-to-DC converter adapted for operation at radio frequencies comprising
a planar substrate of dielectric material
a semiconductor power switching device having two power path terminals and a drive terminal and substantial adjunct shunt capacitance across its power path terminals
a sinusoidal drive source coupled to the drive terminal of the power switching device
a power path terminal of the power switching device being coupled through an impedance matching network to an output circuit including a rectifying circuit and a filter circuit,
the matching network including at least a first inductance embodied as a spiral air core inductance printed on the planar substrate and an input terminal to couple a DC voltage source to the first inductor the matching network further coupled to utilize adjunct capacitance of the power switching device at the radio frequency,
an output circuit coupling the matching network to an output terminal including a rectifying circuit and a filter circuit, the rectifying circuit including a rectifying diode including substantial adjunct capacitance, the rectifying circuit and filtering circuit sharing a second spiral air core inductor printed on the planar substrate in which the adjunct capacitance of the rectifying diode form a substantial portion of circuit reactance of the filter circuit, and
a highly conductive enclosing structure surrounding the substrate and electrical components and including input means coupling to the input terminal and output means coupling to the output circuit, the input means including a first capacitor element formed by coating a first portion of an outer surface of the conductive enclosing structure with a dielectric and a contiguous conductive plate attached thereto and the output means including a second capacitor element formed by coating a second portion of an outer surface of the conductive enclosing structure with a dielectric and a contiguous conductive plate attached thereto.

20. A DC-to-DC converter comprising;
a semiconductor power switch having adjunct capacitance shunting a main conduction path,
input means coupled to the main conduction path for accepting a power source,
driving input means for accepting periodic drive signals having a single frequency to drive the power switch into alternate conductive and nonconductive modes,
a semiconductor rectifier switch having adjunct capacitance shunting its unidirectional conductive path,
output means coupled to the unidirectional conductive path for accepting a load,
a reactive impedance transformation network coupling the main conduction path to the unidirectional conduction path and operative to enable transfer of energy at the single frequency.

21. A DC-to-DC converter as defined in claim 20 further including regulation control for regulating a voltage at the output means and including an error voltage circuit and means for varying the single frequency in response to the error voltage circuit whereby the reactive impedance transformation network is retuned by a change in operating frequency to achieve voltage regulation.

22. A DC-to-DC converter as defined in claim 21 wherein the regulation control includes a voltage controlled oscillator responsive to the error voltage circuit and further including a driver amplifier connected to be driven by the voltage controlled oscillator and further connected to the driving input means.

23. A DC-to-DC converter comprising
inverting means including adjunct reactive components, and operating at a single frequency in the radio frequency range,
input means for coupling power input terminals to the inverting means,
rectifying means including adjunct reactive components, output means for coupling the rectifying means to power output terminals,
a reactive impedance transformer network coupling the inverting means to the rectifying means and operative at the preselected frequency in cooperation with the adjunct reactive components to facilitate transfer of energy at substantially the preselected frequency.

24. A DC-to-DC converter as defined in claim 23 wherein the input means includes a filter operative for blocking harmonics generated by the inverting means from the power input terminals.

25. A DC-to-DC converter as defined in claim 23 further including a voltage regulation circuit operative to regulate output voltage at the power output terminals by varying the single frequency whereby the reactive impedance transformer network is returned to alter signal amplitudes.

26. A DC-to-DC converter as defined in claim 23 wherein the inverting means, rectifying means and the reactive impedance transformer network are totally enclosed within an enclosure of conductive material.

* * * * *

UNITED STATES PATENT AND TRADEMARK OFFICE
CERTIFICATE OF CORRECTION

PATENT NO. : 4,449,174
DATED : May 15, 1984
INVENTOR(S) : Norman G. Ziesse

It is certified that error appears in the above-identified patent and that said Letters Patent is hereby corrected as shown below:

Column 4, line 28, "conrolled" should read --controlled--.
Column 6, line 13, "voltge" should read --voltage--.
Column 10, line 41, "porperties" should read --properties--.
Column 13, line 25, "returning" should read --retuning--.

Signed and Sealed this

First Day of January 1985

[SEAL]

Attest:

GERALD J. MOSSINGHOFF

Attesting Officer

Commissioner of Patents and Trademarks